United States Patent [19]

Bard et al.

[11] 4,399,642
[45] Aug. 23, 1983

[54] AIRCRAFT FLOOR PANEL INSTALLATION SYSTEM

[75] Inventors: Ronald E. Bard; Friedrich J. Gorges, both of Seattle; Robert M. Halsey, Auburn, all of Wash.

[73] Assignee: The Boeing Company, Seattle, Wash.

[21] Appl. No.: 250,751

[22] PCT Filed: Jun. 24, 1980

[86] PCT No.: PCT/US80/00810
§ 371 Date: Jun. 24, 1980
§ 102(e) Date: Jun. 24, 1980

[87] PCT Pub. No.: WO82/00324
PCT Pub. Date: Feb. 4, 1982

[51] Int. Cl.³ .............................. F04C 2/54
[52] U.S. Cl. .............................. 52/483; 52/787
[58] Field of Search ............ 52/787, 483, 506; 411/547, 544, 546; 244/131, 132

[56] References Cited

U.S. PATENT DOCUMENTS

1,031,024  7/1912  Rickles .
2,140,709  12/1938  Mauser .
2,713,482  7/1955  Stapleton .
3,110,064  11/1963  Koontz .
3,742,673  7/1973  Jennings et al. ............... 52/787

FOREIGN PATENT DOCUMENTS

1118795  6/1956  France .
 861884  3/1961  United Kingdom .
 888299  1/1962  United Kingdom .
1497010  1/1978  United Kingdom .

*Primary Examiner*—Carl D. Friedman
*Attorney, Agent, or Firm*—Nicolaas DeVogel; Bernard A. Donahue

[57] ABSTRACT

A floor panel installation system and apparatus using two dimpled washer inserts, each at opposite sides of a floor panel. The two inserts equal a thickness which is almost equal to the floor panel thickness, so that a slight gap exists between the two washers which will close at installation, when the fastener is tightened, thus providing a resilient tightening and sealing feature as well as a "controlled stop" to the fastener installation procedure, avoiding panel crushing, potting compounds, sealers, etc.

3 Claims, 7 Drawing Figures

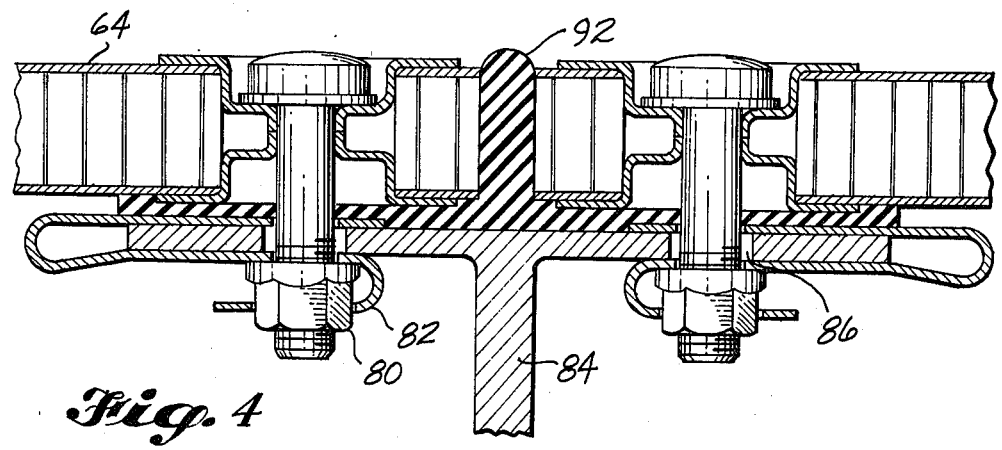
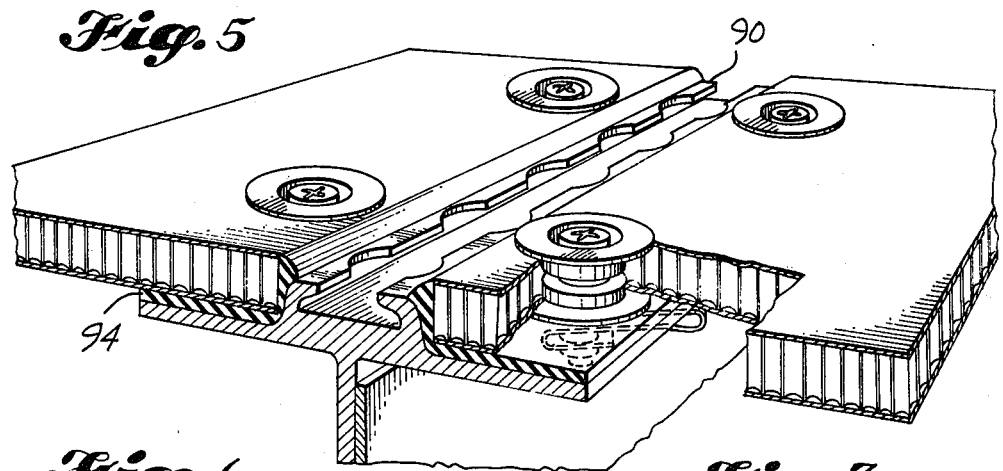
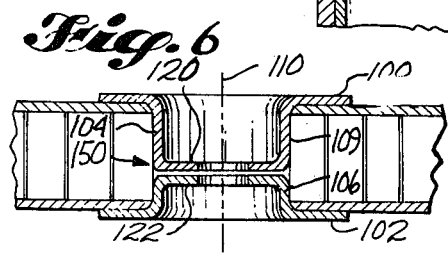
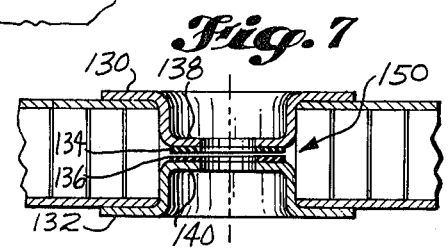

4,399,642

AIRCRAFT FLOOR PANEL INSTALLATION SYSTEM

BACKGROUND OF THE INVENTION

This invention relates to aircraft floor panel installation components and system and in particular to fastener inserts for honeycomb panels.

Aircraft floor panels are generally a composition of two metal sheets separated by a honeycomb core structure. Recently, instead of metal sheets, composite materials, i.e., epoxy, graphite, etc., have been utilized which provide for an even lighter and stronger floor panel structure.

These honeycomb panel structures are fragile in the core area where fasteners are utilized to mount the panel. Accordingly, floor panel attachment methods used a separate insert and screw combination. The inserts were always bonded and potted to the floor panels during floor panel fabrication. The inserts used on honeycomb core floor panels were of two basic types, single piece and two piece.

The single piece has a body and a lower flange. The lower flange is bonded to the lower facesheet of the panel, the body goes thru the panel and is swaged over onto the upper facesheet.

The two piece inserts are two inter-locking pieces each with a flange. The pieces are inserted one from each side of the panel and the flanges are bonded onto the facesheets.

During panel installation, screws are installed through the inserts in order to secure the panels. The herein disclosed dimpled washer system is an improvement which will save time and money in the fabrication and installation phase. In addition, the new installation concept is specifically designed to provide for a more effective moisture sealing arrangement, and a method which would not dimple the facesheets and crush the core, as well as void conventional manufacturing steps.

SUMMARY OF THE INVENTION

The present invention is an improved installation system for floor panels and in particular to inserts for floor panels having a honeycomb type core matrix utilized in aircraft. The system involves using two alike dimpled washers and an optional rubber grommet under the screw head effectively sealing the installation from moisture. Further, electrolytic corrosion is inhibited by the application of an aluminum-pigmented coating to the washers and the screw before installation. The dimpled washers and screws are designed to secure aircraft floor panels to floor support members. These washers are easier, cheaper and lighter to install than conventional floor panel inserts.

The dimpled washer consists of a thin upper flange and a cylindrical body. Two washers are used per hole, one washer inserted in the upper panel surface and the other in the lower panel surface. The washers are either fitted or may be bonded in place using a simple cold bonding process. A rubber grommet is used under the fastener head to insulate the fastener from the dimpled metal washer. Washers and fasteners may be made from titanium, steel, or aluminum.

Upon installation of the washers on each side of the panel, no potting is used to the core structure and no squeezing action is needed for installing the washer inserts. These two manufacturing steps are completely deleted saving time and weight since potting compound is not used, which of course is more economical.

Furthermore, this new installation system of two opposed dimpled washers presents a novel, unique feature because the dimpled washers abut one another as soon as the screw or fastener is tightened and thus automatically provides for a "stop" to the installation. In addition, each washer is slightly deformed upon fastening of the screw which offers a double biased spring force against the annula under surface of the screw head. Thus a non-corecrushing feature, a non-face-dimpling feature and an improved sealing feature is accomplished by the present installation system. In general, an aircraft floor installation apparatus and system is disclosed for floor panels having an upper and a lower face sheet separated by a core and provided with fastening holes, for mounting to an airplane floor beam structure provided with mounting holes. The system uses two washers, the first dimpled washer has its first washer surface positioned on the upper face sheet, and a first sleeve portion, a second washer surface and a second sleeve portion with a bottom edge surface, disposed inside the fastening hole.

Then the second dimpled washer has its first washer surface positioned on the lower facesheet, and a first sleeve portion and a second sleeve portion with an upper edge surface, disposed inside the fastening hole in opposed relationship to the first dimpled washer. In addition, there is a fastener with a head portion, which provides for an annular bottom head surface, and a shank portion adapted to fasten the panel onto the floor beam structure through the fastening hole and the mounting hole. Upon installation of the fastener, the annular bottom head surface applies pressure on the second washer surface of the first dimpled washer causing therein a first spring biased force which result in a sealing arrangement. Also the bottom edge surface of the first dimpled washer engages against the upper edge surface of the second dimpled washer causing a second spring biased force and a controlled installation stop to the fastener so that a spring biased, sealed and controlled positioned sunken fastener installation is accomplished.

BRIEF DESCRIPTION OF THE DRAWINGS

FIG. 4 is a typical aircraft floor panel to floor beam installation.

FIG. 5 is an isometric illustration of a seattrack floor panel installation system.

FIG. 6 is a second insert embodiment.

FIG. 7 is a third insert embodiment.

DETAILED DESCRIPTION OF THE INVENTION

Figure 1:
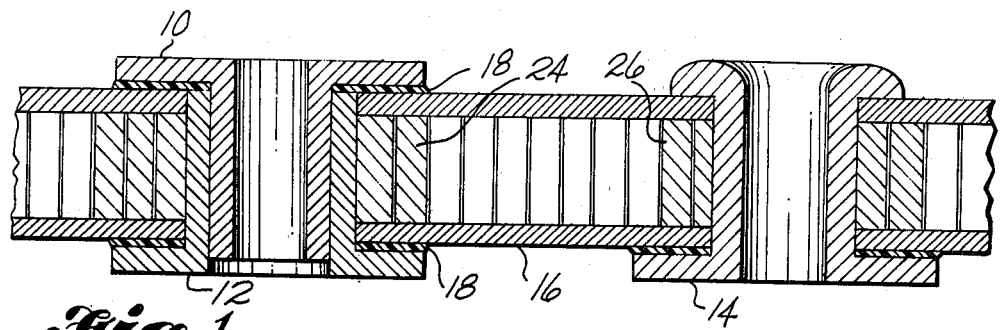
FIG. 1 illustrates two different inserts utilized conventionally for aircraft floor panel installations.

As discussed, the conventional system of mounting floor panels in aircraft is performed with the assistance of hole insert devices 10, 12 and 14 which are squeezed, cramped or swaged into a potted hole in a floor panel 16. As illustrated in FIG. 1, the double inserts 10 and 12 are also glued or bonded 18 to the panel 16. The swaged device 14 is bonded 20 at one side and swaged onto the panel 16 at the other side. It should be realized that the potting procedure utilizing potting compound 24 in the hole-core-area requires installation time and is essential when conventional floor panel installation systems are used. The potting material 24 hardens and reinforces the core 26 so that the inserts 10-12-14 can be squeezed and swaged onto the panel 16 without damage to the core 26 structure.

Figure 2:
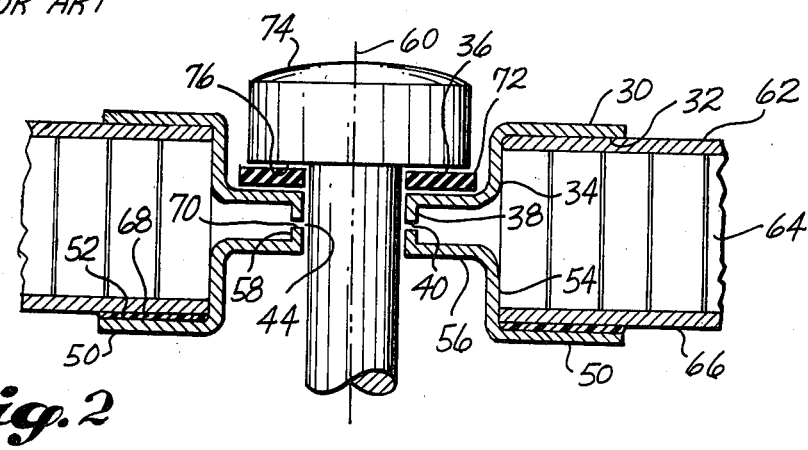
FIG. 2 illustrates the preferred embodiment of two dimpled washer inserts prior to installation.
Figure 3:
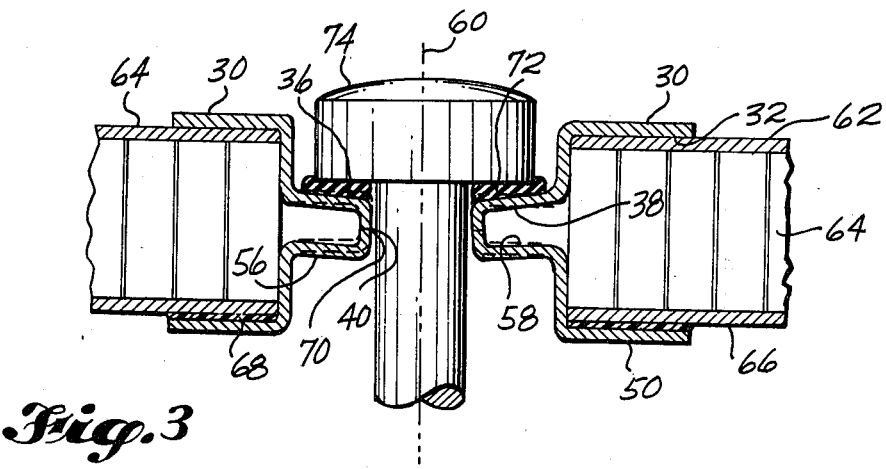
FIG. 3 illustrates the washer/fastener arrangement when a panel is installed.

The basic operation of the installing system of the present invention is disclosed in FIGS. 2 and 3.

As illustrated, two dimpled washers 30 and 50 are utilized.

The first washer 30 has a first washer surface 32 which is positioned at the fastener hole 60 and on contact with the upper facesheet 62 of the panel 64. The washer 30 has a first sleeve portion 34, which circumference fits inside the hole 60 circumference in the panel 64, and furthermore, extends into a second washer surface 36 which is parallel to the first washer surface 32 and terminates in a second sleeve portion 38 with an annular bottom edge surface 40.

The second dimpled washer 50 is positioned at the opposite side or lower facesheet 66 of the panel 64 and is positioned with its first washer surface 52 against the lower facesheet 66 and optionally bonded thereto by glue 68 or the like. The second washer 50 is dimpled so that a first sleeve portion 54, a second washer surface 56, a second sleeve portion 58 with an upper annular surface 70 is formed.

In order to assure a leakproof condition a rubber grommet 72 may be inserted on the first washer 30 second washer surface 36 and also a moisture sealing glue 68 may be provided between surfaces 62 and 32.

An associated fastener or screw with a head 74 forming an annular bottom head surface 76 and a shank 78 is inserted in the opening 60 provided by the second sleeve portions 38 and 58 of the washers 30 and 50.

In the typical installation illustrated in FIGS. 4 and 5 a nut 80 and nut plate 82 are utilized at the aircraft floor beam structure 84 after the shank 78 is passed through the mounting hole 86 provided in the structure 84.

When the installation of the floor panel 64 onto the floor beam 84 takes place, the fastener 74 will contact the second washer surface 36 of the first dimpled washer 30 and its resilient material will provide a spring biased seal. By the optional addition of a rubber grommet 72 an absolute moisture sealing is obtained. Upon further tightening of the fastener the bottom edge surface 40 will come in contact with the upper edge surface 70, the gap 44 disappears, and cause a second spring biased seal but also provides for a stop. The mechanic or installer will thus know that the correct fastening or installing is obtained. The offset of the second sleeve portions 38 and 58 and the second washer surfaces 36 and 56, are illustrated in an exaggerated fashion in FIG. 3, however the offset is in reality very slight.

The installation in FIG. 5 relates to the floor panel installation system where a seattrack 90 is located. It will be noted that the illustration in FIG. 5 and the illustration in FIG. 4 show the existence of a rubber type sealing strip 92 and 94 respectively. These strips 92 and 94 are optional and are new proposed concepts which may be incorporated with the present conventional systems. In general, conventional systems utilize a narrow taped resilient seal at the panel edge locations.

The basic and preferred embodiment of the present invention and its operational interactions are thus disclosed in FIGS. 2 and 3 and their typical equivalent overall installation shown in FIGS. 4 and 5. It should be understood that it would be preferable, for economic reasons, etc., that the two dimpled washers 30 and 50 are identical and when stacked together equals almost the thickness of the floor panel but in such a way that a slight gap 44 is obtained between the facing bottom and upper edge surfaces 40 and 70 of the washers 30 and 50 respectively.

As mentioned before, a significant saving in time and money is obtained because the panel 64 does not need potting material around the hole 60 or washers 30 and 50 in its core structure 46.

Bonding of the second washer 50 between the first washer surface 52 and the lower face sheet 66 depends on the surface material that is utilized underneath the lower facesheet 66. In the present illustrations, bonding 68 is recommended because of the presence of the seaing strips 92 and 94. If no sealing strips are utilized or if the second washer rests on a flat, hard surface of the structural beam 84, then no bonding is needed since the fastener installation will not be able to dislodge or push out the second washer from the fastener hole 60.

Because various modifications can be made, which basically present the same solutions as explained for the preferred embodiment illustrated in FIGS. 2 through 5, it is deemed necessary to disclose a second and third preferred embodiment, as illustrated in FIGS. 6 and 7.

In FIG. 6 the emphasis is directed to simpler washer constructions 100 and 102, which have sleeves 104 and 106 respectively. In the present illustration the sleeves have a tight fit with the hole 110, however a smaller diameter is also possible and would provide an adjustment feature in respect to the location of the mounting hole. During installation the second washer surface 120 of the washer 100 will be tightened in contact with the second washer surface 122 of washer 102 and create a biased seal and "stop" with the fastener head area (not shown). In FIG. 7 the configuration of the washers 130 and 132 is somewhat similar except for the provisions of a resilient seal material 124 and 136 on the inner surface portions of 138 and 140. A slight gap 150 is shown in both embodiments which as explained before will close when the fastener is tightened upon installation of the panel. The first embodiment provides for a definite secured "stop" situation upon tightening of the fastener while this situation is less apparent in the other embodiments.

Having thus described the various details and preferred embodiment of the present invention the following claims are made:

1. An aircraft floor installation apparatus and system for floor panels having an upper and a lower facesheet separated by a core and provided with fastening holes, for mounting to an airplane floor beam structure provided with mounting means, comprising in combination:
   (a) a first dimpled washer having a first washer surface positioned on said upper facesheet, a first sleeve portion and a second washer surface, disposed inside said fastening hole,
   (b) a second dimpled washer having a first washer surface positioned on said lower facesheet, a first sleeve portion, a second washer surface, disposed inside said fastening hole in opposed relationship to said first dimpled washer,
   (c) a resilient sealing material disposed between said second surface of said first dimpled washer and said second surface of said second dimpled washer and, (d) an associated fastener with a head portion, an annular bottom head surface, and a shank portion, adapted to fasten said panel onto said floor beam structure through said fastening hole and said mounting means whereby upon installation of said fastener, said annular bottom head surface applies pressure on said second washer surface of said first dimpled washer causing therein a first spring biased force and a sealing arrangement with said resilient material while a stop is provided to said fastener installation by said second washer surface of said second dimpled washer so that a spring biased, sealed and controlled positioned sunken fastener and panel to floorbeam installation is accomplished.

2. An insert arrangement forming part of a mounting system for sunken head fasteners for panel compositions having two sheets separated by a core material and for securing said panel in a sealed, undamaged, controlled secured relationship to an associated structure and wherein said panel is provided with fastening holes, characterised by:

(a) a first and a second dimpled washer, each having a first annular washer surface larger in diameter than said fastening hole, a first sleeve portion having a diameter smaller than said hole and a second annular washer surface;

(b) said first and said second dimpled washer disposed in opposite relationship to one another in said fastener hole so that said first annular washer surfaces overlap against each outside surface of said panel;

(c) said first and said second dimpled washer first sleeves and second washer surfaces disposed in said fastening hole so that each said dimpled washers are in spaced apart relationship to one another in said fastening hole, and (d) wherein said first dimpled washer receives said sunken head of said sunken head fastener within said first sleeve, and (e) wherein upon fastening of said fastener said first dimpled washer contacts against said second dimpled washer thereby eliminating said spaced apart relationship whereby a secured biased stop is caused upon contact of said first dimpled fastener against said second dimpled fastener.

3. A crushless mounting arrangement for honeycomb floor panels or the like, comprising in combination:

(a) a honeycomb floor panel provided with fastening holes, (b) a base structure provided with mounting holes, (c) a first dimpled washer having a first washer surface, disposed on said floor panel, and a first sleeve portion, a second washer surface, and a second sleeve portion with a bottom edge surface, positioned inside said fastening hole, (d) a second dimpled washer insert having a first sleeve portion positioned inside said fastening hole, in opposed relationship to said first dimpled washer, and a second sleeve portion with an upper edge surface, (e) said first dimpled washer bottom edge surface and said second dimpled washer upper edge surface forming a gap between said first and said second washer, and (f) an associated fastener with a head portion providing an annular bottom head surface and a shank portion adapted to fasten said panel onto said base structure through said fastening hole and said mounting hole whereby upon installation of said fastener, said annular bottom head surface applies pressure on said second washer surface of said first dimpled washer causing a first spring biased force within said first washer and consecutively a sealing arrangement when said bottom edge surface of said first dimpled washer makes contact against said upper edge surface of said second dimpled washer, thereby closing said gap and thereby causing a second spring biased force within said second washer and a controlled installation stop so that a spring biased, sealed and controlled sunken fastener and crushless installation of said panel is accomplished.

* * * * *